Nov. 12, 1940.     A. GORDON     2,220,877
DISPENSING APPARATUS
Filed Dec. 13, 1937
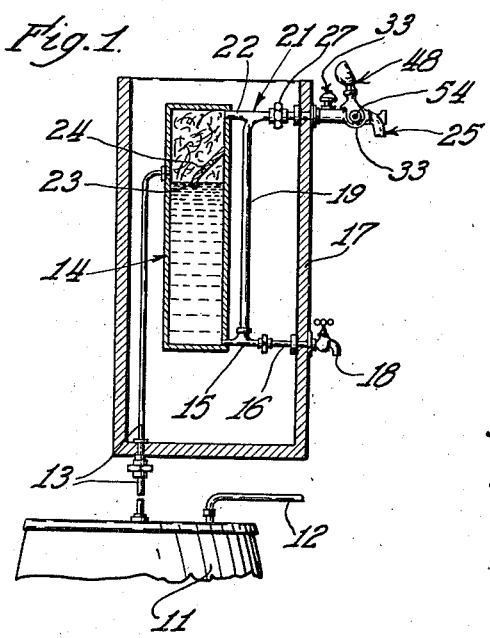
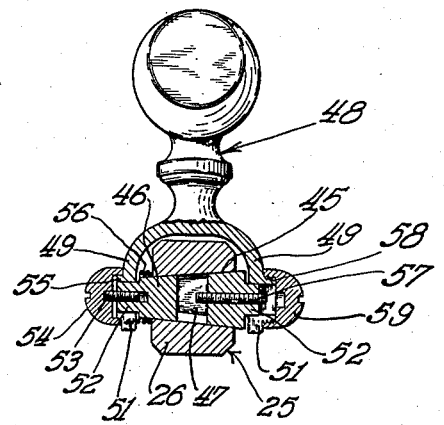
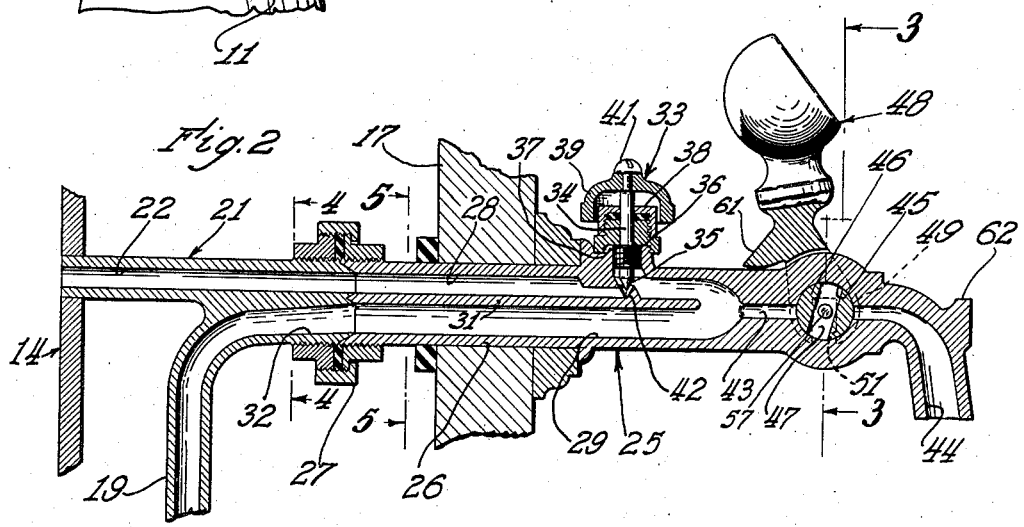
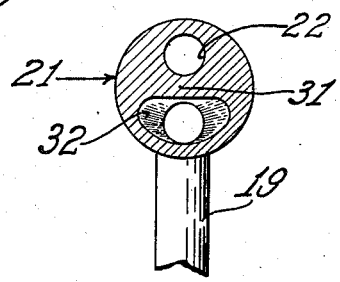
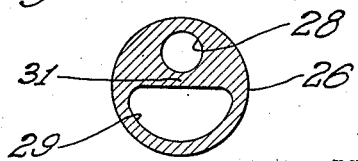
INVENTOR.
Arthur Gordon
BY Rasmussen & Brugman
ATTORNEYS.

Patented Nov. 12, 1940

2,220,877

UNITED STATES PATENT OFFICE 2,220,877

DISPENSING APPARATUS

Arthur Gordon, Chicago, Ill.

Application December 13, 1937, Serial No. 179,434

1 Claim. (Cl. 225—5)

This invention relates in general to dispensing apparatus, and more particularly to an apparatus which is adapted to dispense a mixture of two fluids having different specific gravities in such a manner as to obtain a predetermined desired ratio between said fluids.

In my prior Patent No. 1,917,582, issued July 11, 1933, I have provided a dispensing apparatus which comprises a separator for separating the liquid and gaseous portions of a beverage, together with a faucet connected therewith and adapted to withdraw the beverage from the separator with a predetermined ratio between the liquid and gaseous portions thereof.

One important object of the present invention is the provision of a new and improved faucet or mixer mechanism for dispensing a predetermined mixture of two fluids having different specific gravities which is particularly adapted to be used with the type of separator disclosed in my prior patent.

Another important object of the invention is the provision of improved valve mechanism in such a faucet or mixer which is adapted to be adjusted so as to vary the rate of withdrawal of the desired mixture when the valve mechanism is in fully opened position.

A further important object of the invention is the provision of improved valve mechanism associated with such a faucet or mixer for adjustably regulating the flow of one of the fluids to vary the ratio between the component parts of the mixture which is delivered thereby.

In the use of dispensing apparatus, such as that disclosed in my prior patent above referred to, it is necessary to periodically clean the same to comply with standard health regulations.

Another important object of my invention, therefore, is the provision of a dispensing device which particularly lends itself to thorough and complete cleaning and sterilization whenever desired.

Numerous other objects and advantages of the invention will be apparent as it is better understood from the following description, which, when taken in connection with the accompanying drawing, disclose a preferred embodiment thereof.

In the drawing:

Figure 1 is a side elevational view of a preferred form of the dispensing apparatus with parts shown in section;

Figure 2 is a vertical sectional view of the improved faucet or mixer mechanism shown in Fig. 1; and Figures 3, 4 and 5 are detail vertical sectional views taken substantially on the lines 3—3, 4—4 and 5—5, respectively, of Fig. 2.

With this apparatus, two fluids of different specific gravity, such as the liquid and gaseous portions of a beverage, are fed at the same time through a separating faucet or mixer where the flow of one fluid is regulated as desired with respect to that of the other, and in which a separate adjustment may be made to vary the rate of withdrawal of the predetermined mixture when the faucet is in fully opened position.

Referring more particularly to the drawing, reference numeral 11 indicates a bulk container, such as a barrel, from which a beverage, such as beer, is to be dispensed. The container 11 is provided with a conduit 12 leading to the usual air compressor or the like (not shown), and an outlet pipe 13 which extends to a point directly adjacent the bottom of the container in the usual and well-known manner. If it is desired, a shut-off valve (not shown) may be mounted in this outlet pipe 13.

The outlet pipe 13 is connected at its upper end with the upper end of a separator tank, indicated generally by reference numeral 14. This tank is similar in construction to the tank 13 of my prior patent above referred to. Connected to the tank 14 directly adjacent the bottom thereof, is a fitting 15 which has a pipe 16 leading therefrom through the wall of a cooling cabinet 17 within which the separator is disposed. The outer end of the pipe 16 is provided with a faucet 18 for completely draining the separator during a cleaning operation, as will be more fully described hereinafter, or for drawing off the liquid portion only of the beverage from the bottom thereof. A pipe 19 is connected to the fitting 15 and extends upwardly therefrom to a terminal fitting 21, which in turn is similarly connected to another pipe 22 communicating at its other end with the upper portion of the separator tank 14.

A baffle or partition plate 23 is mounted within the separator tank 14 adjacent its upper end, and is angularly disposed relative to the walls of the tank, as shown in Fig. 1. This baffle 23 is preferably provided with a plurality of apertures 24 therethrough which facilitate its function of separating the gaseous or foam and liquid portions of the beverage delivered to the tank by the pipe 13. It will be appreciated that the beverage is so delivered to the tank 14 under pressure, and the gaseous or foam portion thereof will collect adjacent the point of connection of the pipe 22 with the tank, while the liquid portion of the beverage will collect in the lower end of the tank.

The improved dispensing faucet or mixer disclosed herein is indicated generally by reference numeral 25, and comprises a substantially tubular portion 26, which extends through the wall of the cooling cabinet 17 and is shown as being connected at its inner end to the outer end of the terminal fitting 21 by a suitable coupling or union 27. The interior of this portion of the faucet 25 is divided into a relatively small circular passage 28 and a materially larger passage 29, disposed therebelow and having a substantially semi-circular cross section, by a wall portion 31. The upper passage 28 is coaxially disposed relative to the pipe 22 which delivers the gaseous or foam portion of the beverage to the faucet 25. The lower passage 29 communicates directly with the enlarged outer end 32 of the liquid delivering pipe 19. The relative sizes of these several passages are best shown in the detail sections of Figs. 4 and 5. Since the gaseous or foam and liquid portions of the beverage in the separator tank 14 are under the same pressure, the difference in cross sectional area of the passages 28 and 29 will insure the flow of a predetermined ratio of the two different portions of the beverage through the faucet 25.

Additional means is provided for adjustably varying this predetermined ratio by variably restricting the upper passage 28. This means comprises an adjustable needle valve, indicated generally by reference numeral 33, which corresponds in function to the thumb screw 29 of my prior patent above referred to, but which produces materially improved results. The valve 33 comprises a stem portion 34 having a conical point 35 at its lower end, and a threaded portion 36 intermediate its ends which cooperates with a suitable tapped aperture extending through an upstanding lug 37 formed on the tubular portion 26 of the mixer 25 adjacent the outer end thereof. The outer portion of the valve stem 34 extends upwardly through a suitable packing gland 38 which is connected in the usual manner to the outer surface of the lug portion 37. A protecting bell or skirt portion 39 is connected to the outer end of the valve stem 34 by a screw 41, and constitutes a means for manually adjusting the vertical position of the valve stem 34. The interior wall portion 31 of the mixer 25 is provided with a conical valve seat 42 directly below the lower end of the valve stem 34 with which the conical end 35 of the valve stem is adapted to cooperate to vary or restrict the passage 28.

The wall portion 31 terminates short of the outer end of the tubular portion 26 of the mixer so that the passages 28 and 29 converge and terminate in a discharge passage 43, which extends through the outer end of the mixer and terminates in a discharge opening 44. The discharge passage 43 is enlarged intermediate its ends to provide a valve receiving aperture or recess 45. Extending transversely through the aperture 45 is a tapered valve member 46 having a transverse aperture 47 therein which is adapted to be moved into and out of register with the discharge passage 43, and is of substantially the same cross sectional area as the latter passage. In order to rotate the valve member 46, a valve handle 48 is provided having lower leg portions 49 which straddle the tubular portion 26 and are provided with slots 51 to engage rectangular end projections 52 provided on the valve member 46.

The smaller end of the tapered valve member 46 is secured to the associated leg 49 of the valve handle 48 by a suitable screw 53, which has a cap 54 secured to its outer end and engages a flange 55 formed on the outer surface of this leg 49. A coil spring 56 surrounds the small end of the tapered valve member 46, and is disposed between the associated leg 49 of the valve handle 48 and the side surface of the tubular portion 26 of the faucet 25 to resiliently maintain the valve member in frictional engagement with its receiving aperture 45. A screw 57 (Fig. 3) extends through a suitable tapped aperture in the larger end of the valve member 46 so as to be adjustable into and out of the transverse aperture 47 at its inner end, the screw 57 having only a slightly smaller cross sectional area than that of the aperture 47 (Fig. 2). The leg member 49 of the handle 48 associated with this larger end of the valve member 46 is provided with a threaded flange 58 surrounding the outer end of the screw 57 upon which a suitable cap member 59 is removably mounted. The valve handle 48 is preferably provided with a rearwardly disposed projection 61 for limiting the counterclockwise movement thereof (viewing Fig. 2). Clockwise or opening movement of the valve is adapted to be limited by a lug 62 formed on the upper surface of the outer end of the mixer in the path of movement of the valve handle.

This flow controlling valve structure is adapted to be adjusted by simply removing the cap member 59 and screwing the screw 56 into or out of the valve aperture 47 to vary the size of said aperture. When the desired adjustment has thus been made, opening of the valve by moving the handle 48 forwardly into contact with the lug 62 will result in a predetermined rate of flow of the fluid mixture through the discharge passage 43 and opening 44. This adjustment is of particular importance in compensating for different pressures and differences in pressure encountered in different installations in the separator tank 14.

It will thus be seen that adjustment of the two valve members herein provided makes it possible to dispense a mixture of two fluids having different specific gravities, such as a beverage comprising a liquid and a gaseous or foam portion, at a desired rate of flow, with the valve 46 in fully opened position, and in any desired ratio of the component portions thereof. In this manner a predetermined mixture of fluids may be dispensed in the most rapid possible manner without the unnecessary waste usually attendant therewith. The invention has been illustrated herein as applied to a beer dispensing apparatus, but it will be readily apparent that the mixer 25 is equally well adapted for use in dispensing other beverages, such as root beer, mixtures for sodas, etc., and for mixing and dispensing any two fluids, either in a gaseous or liquid state, such as hot and cold water, etc. In this connection, the passages 28 and 29 may be connected, respectively, to any suitable source or separate sources of the desired fluids.

The arrangement of the faucet 18 so as to communicate directly with the very bottom portion of the tank 14 facilitates thorough and complete cleaning of this tank in a manner which heretofore has not been possible. To clean the instant apparatus, it is only necessary to drain the tank 14, if such has not already been done, and pass a flushing fluid rearwardly through the faucet or mixer 25 and tank 14 and out of the faucet 18. The connection of the faucet 18 with the bottom of the tank assures the complete removal of all residue therefrom.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

In a beverage dispensing device having means for separating the heavier and lighter portions of the beverage, means for simultaneously drawing off said portions of the beverage in predetermined ratio and at a desired rate of withdrawal, comprising a faucet having separate passages therein for receiving the two portions of the beverage, respectively, the cross sectional area of the passage for receiving the heavier portion being larger than, and in predetermined ratio to, the cross sectional area of the passage receiving the lighter portion of the beverage, an adjustable needle valve mounted on said faucet for variably restricting the passage receiving the lighter portion of the beverage, a discharge passage communicating with both of said first two passages, and a tapered valve member mounted in said discharge passage having a transverse aperture therethrough adapted to be moved into coincidence with said discharge passage and an adjustable screw extending into said transverse aperture for varying the cross sectional area thereof.

ARTHUR GORDON.